(12) United States Patent
Addorisio et al.

(10) Patent No.: US 12,460,296 B2
(45) Date of Patent: Nov. 4, 2025

(54) GAS DIFFUSER HOUSINGS, DEVICES, AND RELATED METHODS

(71) Applicant: ENTEGRIS, INC., Billerica, MA (US)

(72) Inventors: Michael Addorisio, Peabody, MA (US); David McCrimmon, Andover, MA (US); Virendra Warke, North Chelmsford, MA (US); Devon Nichole Dion, Nashua, NH (US); Benjamin Schooler, Belmont, MA (US)

(73) Assignee: ENTEGRIS, INC., Billerica, MA (US)

( * ) Notice: Subject to any disclaimer, the term of this patent is extended or adjusted under 35 U.S.C. 154(b) by 472 days.

(21) Appl. No.: 17/983,907

(22) Filed: Nov. 9, 2022

(65) Prior Publication Data
US 2023/0151490 A1  May 18, 2023

Related U.S. Application Data

(60) Provisional application No. 63/280,283, filed on Nov. 17, 2021.

(51) Int. Cl.
| | | |
|---|---|---|
| *C23C 16/40* | (2006.01) | |
| *B29C 64/153* | (2017.01) | |
| *B29C 64/268* | (2017.01) | |
| *C23C 16/455* | (2006.01) | |
| *B33Y 10/00* | (2015.01) | |

(Continued)

(52) U.S. Cl.
CPC ...... *C23C 16/45559* (2013.01); *B29C 64/153* (2017.08); *B29C 64/268* (2017.08); *C23C 16/45563* (2013.01); *B33Y 10/00* (2014.12); *B33Y 30/00* (2014.12); *B33Y 80/00* (2014.12)

(58) Field of Classification Search
CPC ........ C23C 16/45559; C23C 16/45563; C23C 16/45561; C23C 16/54; C23C 16/45551; C23C 16/545; C23C 16/4412; C23C 14/568; C23C 16/4401; B29C 64/153; B29C 64/268; B33Y 10/00; B33Y 30/00; B33Y 80/00; B33Y 70/10; B22F 5/10; B22F 10/28; H01L 21/67017; H01L 21/6719; H01L 21/67196; H01L 21/67201; H01L 21/67173; H01L 21/67184; H01L 21/6776; H01L 21/67161; H01L 21/67155; H01L 21/67069; H01L 21/67748; H01L 21/67751; H01L 21/67745; H01J 37/3244; H01J 37/32449
USPC ............... 118/715, 719; 156/345.33, 345.34, 156/345.31, 345.32
See application file for complete search history.

(56) References Cited

U.S. PATENT DOCUMENTS

| | | | | |
|---|---|---|---|---|
| 5,107,707 A | * | 4/1992 | Takahashi | G01C 19/58 73/504.06 |
| 5,188,671 A | * | 2/1993 | Zinck | C30B 23/06 118/726 |
| 5,209,402 A | | 5/1993 | DeBra et al. | |

(Continued)

FOREIGN PATENT DOCUMENTS

| | | |
|---|---|---|
| CN | 102017119 A | 4/2011 |
| CN | 110073031 A | 7/2019 |

(Continued)

*Primary Examiner* — Rudy Zervigon

(57) ABSTRACT

Described are directional gas diffuser devices and housing components thereof; systems that include the gas diffuser devices; methods of using the gas diffuser devices; and methods of manufacturing gas diffuser devices.

25 Claims, 7 Drawing Sheets

(51) Int. Cl.
*B33Y 30/00* (2015.01)
*B33Y 80/00* (2015.01)

(56) References Cited

U.S. PATENT DOCUMENTS

| | | | |
|---|---|---|---|
| 5,647,911 A | 7/1997 | Vanell et al. | |
| 7,850,780 B2 | 12/2010 | Levy et al. | |
| 8,123,902 B2 | 2/2012 | Brillhart et al. | |
| 8,241,549 B2 | 8/2012 | Frankel et al. | |
| 8,329,593 B2* | 12/2012 | Yousif | H01J 37/3244 438/725 |
| 8,795,793 B2 | 8/2014 | Choi et al. | |
| 9,899,246 B2 | 2/2018 | Lin et al. | |
| 10,215,317 B2 | 2/2019 | Burkhart et al. | |
| 2003/0219536 A1 | 11/2003 | Shin et al. | |
| 2004/0231798 A1* | 11/2004 | Gondhalekar | H01L 21/67109 156/345.33 |
| 2005/0092245 A1* | 5/2005 | Moon | H01J 37/3244 118/715 |
| 2009/0156013 A1* | 6/2009 | Yousif | H01J 37/3244 156/345.35 |
| 2011/0114534 A1 | 5/2011 | Watson et al. | |
| 2011/0116209 A1 | 5/2011 | Park | |
| 2011/0198417 A1* | 8/2011 | Detmar | H01J 37/321 239/589 |
| 2012/0076936 A1* | 3/2012 | Hirano | C23C 16/45563 118/724 |
| 2013/0121851 A1 | 5/2013 | Kim | |
| 2015/0292088 A1* | 10/2015 | Canizares | C23C 16/45504 118/715 |
| 2015/0357218 A1 | 12/2015 | Lin et al. | |
| 2016/0217979 A1* | 7/2016 | Kim | H01J 37/3244 |
| 2017/0178867 A1* | 6/2017 | Kudela | H01J 37/32532 |
| 2017/0239726 A1 | 8/2017 | Palumbo et al. | |
| 2017/0323775 A1 | 11/2017 | Saly et al. | |
| 2018/0094353 A1* | 4/2018 | Huang | H01J 37/3244 |
| 2019/0311929 A1 | 10/2019 | Woo et al. | |
| 2020/0131637 A1* | 4/2020 | Chen | C23C 16/45563 |
| 2021/0025057 A1* | 1/2021 | Soininen | C23C 16/54 |
| 2023/0151490 A1* | 5/2023 | Addorisio | B29C 64/268 118/715 |
| 2023/0238218 A1* | 7/2023 | Liu | H01J 37/32449 239/553 |

FOREIGN PATENT DOCUMENTS

| | | |
|---|---|---|
| CN | 111128794 A | 5/2020 |
| CN | 112640079 A | 4/2021 |
| CN | 219260185 U | 6/2023 |
| KR | 101147192 B1 | 5/2012 |
| KR | 20150077106 A | 7/2015 |
| KR | 20150004506 U | 12/2015 |
| KR | 20160078185 A | 7/2016 |
| KR | 20160115539 A | 10/2016 |
| KR | 20180123862 A | 11/2018 |
| TW | 202025247 A | 7/2020 |

\* cited by examiner

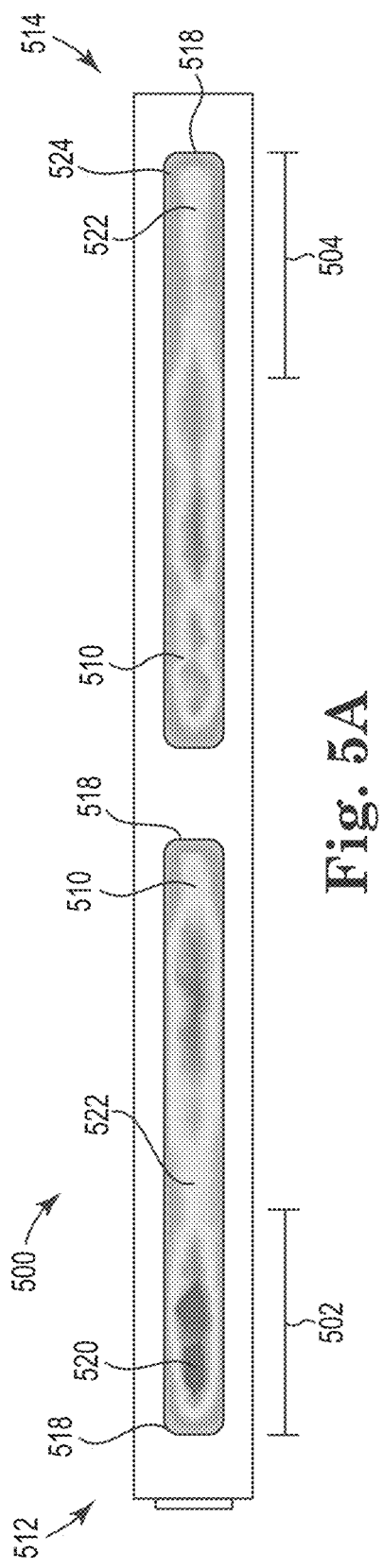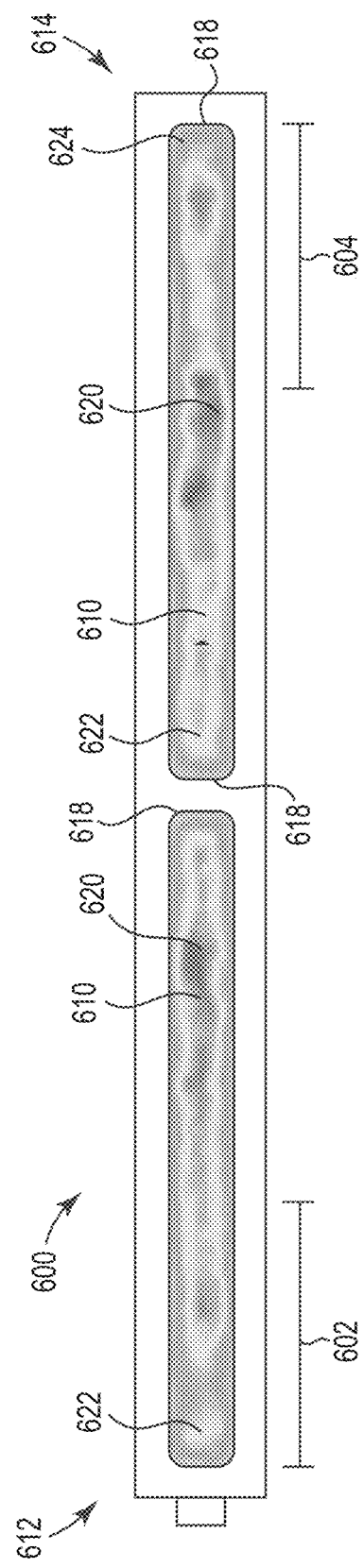

GAS DIFFUSER HOUSINGS, DEVICES, AND RELATED METHODS

CROSS-REFERENCE TO RELATED APPLICATIONS

This application claims the benefit under 35 USC 119 of U.S. Provisional Patent Application No. 63/280,283, filed Nov. 17, 2021, the disclosure of which is hereby incorporated herein by reference in its entirety.

FIELD

The description relates to gas diffuser devices, specifically directional gas diffuser devices and a housing component thereof, systems that include the gas diffuser devices, methods of using the gas diffuser devices, and methods of manufacturing gas diffuser devices.

BACKGROUND

Various industrial processes and manufacturing systems involve process steps and equipment that dispense a gas into an enclosed interior space of a chamber that is used to process, store, transport, or handle one or more semiconductor wafers during manufacturing. Example systems include systems for processing semiconductor and microelectronic devices, that supply a gas that is used in a process of cleaning, etching, or a material deposition step (e.g., chemical vapor deposition, atomic vapor deposition, etc.). Gases supplied to these systems include reactive gases, corrosive gases, e.g., hydrogen bromide (HBr) and other halide-containing gases, and inert gases.

Other systems include equipment that is used to contain, handle, transfer, or move multiple semiconductor wafers, examples being devices referred to as wafer transfer chambers, wafer carriers ("FOUPs"), and the like. These pieces of equipment include an enclosed interior space that is adapted to contain multiple semiconductor wafers while the wafers are being processed. The enclosed space of the device contains the wafers and may contain an atmosphere that is evacuated (i.e., that is under reduced pressure) or contains a gas different from air, e.g., an inert gas.

As one example, a wafer transfer station is a device that contains a chamber with an enclosed interior that is evacuated during use, while multiple in-process semiconductor wafer are held at the interior. Before opening the evacuated chamber to remove the wafers, gas can be returned to the enclosed interior to equalize the pressure of the interior with an exterior (ambient) pressure. The gas may be an inert gas, and is typically introduced into the enclosed interior through a device referred to as a diffuser. The diffuser introduces the gas into the interior of the transfer station in a steady and diffused manner, to avoid disrupting any contaminant particles that may be present at the interior, which if disrupted may settle at a surface of a wafer. Another device that includes an enclosed space that is adapted to contain multiple semiconductor wafers is a wafer carrier, sometimes referred to as a "FOUP," which may stand for "Front Opening Unified Pod" or Front Opening Universal Pod." A FOUP contains multiple semiconductor wafers at an enclosed interior, to transport the wafers. During use, while containing the wafers at the chamber interior, the interior is filled with an inert gas atmosphere, as opposed to an air atmosphere. The inert gas is typically added to the enclosed chamber interior by a diffuser. The diffuser introduces the inert gas into the interior of the wafer carrier as a steady and diffused flow, to avoid disrupting contaminant particles that may be present at the interior, which if disrupted may settle at a surface of a wafer.

SUMMARY

Described are diffuser housings for a directional gas diffuser, that are useful to dispense a gaseous raw material into an enclosed interior of a chamber of a semiconductor handling or processing device, or other reaction chamber, vacuum chamber, or the like. Also described are diffuser assemblies that include the housing and other components of a diffuser such as a diffuser membrane, methods of making the housing and diffuser assemblies, processing systems that include the diffuser assembly, and methods of using the housing and diffuser assemblies.

According to example diffuser housings, the housing comprises an elongate body that includes an inlet at one end, a second end that is closed, and a diffuser outlet (e.g., "opening") that extends over a face of the body along the length between the inlet end and the closed end. A channel at the interior of the housing extends along the length, between the inlet end and the closed end, and is connected to the inlet and to the diffuser outlet. The channel can have varied dimensions along the length of the diffuser housing to improve uniformity of flow through the diffuser outlet. For example, a channel may have a varied cross-sectional area, depth, or both, when viewed in a direction along the longitudinal axis, at different locations along the length. The cross-sectional area or depth of the channel may be reduced at locations closer to the closed end to improve uniformity of flow of a gas through the diffuser outlet, along the length.

A diffuser body as described may be prepared by any useful method, with certain useful or presently preferred methods including additive manufacturing techniques, which include methods that are commonly referred to as "3-D printing" techniques. The method generally involves a series of individual layer-forming steps that sequentially form multiple layers of solidified feedstock composition derived from a layer of feedstock, to form a diffuser housing. Some specific examples of general types of additive manufacturing techniques include those commonly referred to as "powder-bed" additive manufacturing methods, which include various "binder jet printing" techniques. Other examples include stereolithography techniques (SLS) and "feedstock dispensing methods" (FDMs). Still others are referred to as "laser metal deposition," "direct metal deposition," and direct energy deposition." Diffuser bodies as described may be prepared by any of these additive manufacturing methods, as well as others that may be currently known or developed at a future time.

In one aspect, the invention relates to a directional gas diffuser that includes an elongate housing. The housing includes: an inlet end, a closed end, a length between the inlet end and the closed end, an opening that extends along the length on a front side of the housing, a channel extending between the inlet end and the closed end. The channel is defined along the length by: the opening extending along the front side, an elongate back surface, and elongate side surfaces. The channel has a length, a width, a depth, and a varied cross-sectional area along the channel length.

In another aspect, the invention relates to a directional gas diffuser that includes an elongate housing that includes: an inlet end that comprises an inlet, a closed end, a length between the inlet end and the closed end, an opening that extends along the length on a front side of the housing, an interior channel extending between the inlet and the closed end, the channel defined along the length by: the opening on the front side; an elongate, non-porous back surface; and, elongate non-porous side surfaces.

In yet another aspect, the invention relates to a method of making a directional gas diffuser as described, by additive manufacturing. The method includes: forming a first feedstock layer on a surface, the feedstock layer comprising inorganic particles; forming solidified feedstock from the first feedstock layer; forming a second feedstock layer over the first feedstock layer, the second feedstock layer comprising inorganic particles; and forming second solidified feedstock from second feedstock layer; wherein the solidified feedstock layers are part of a directional gas diffuser.

BRIEF DESCRIPTION OF THE DRAWINGS

FIGS. 5A and 5B show a comparison of flow of a gas through diffuser devices as described.

Figure 1:
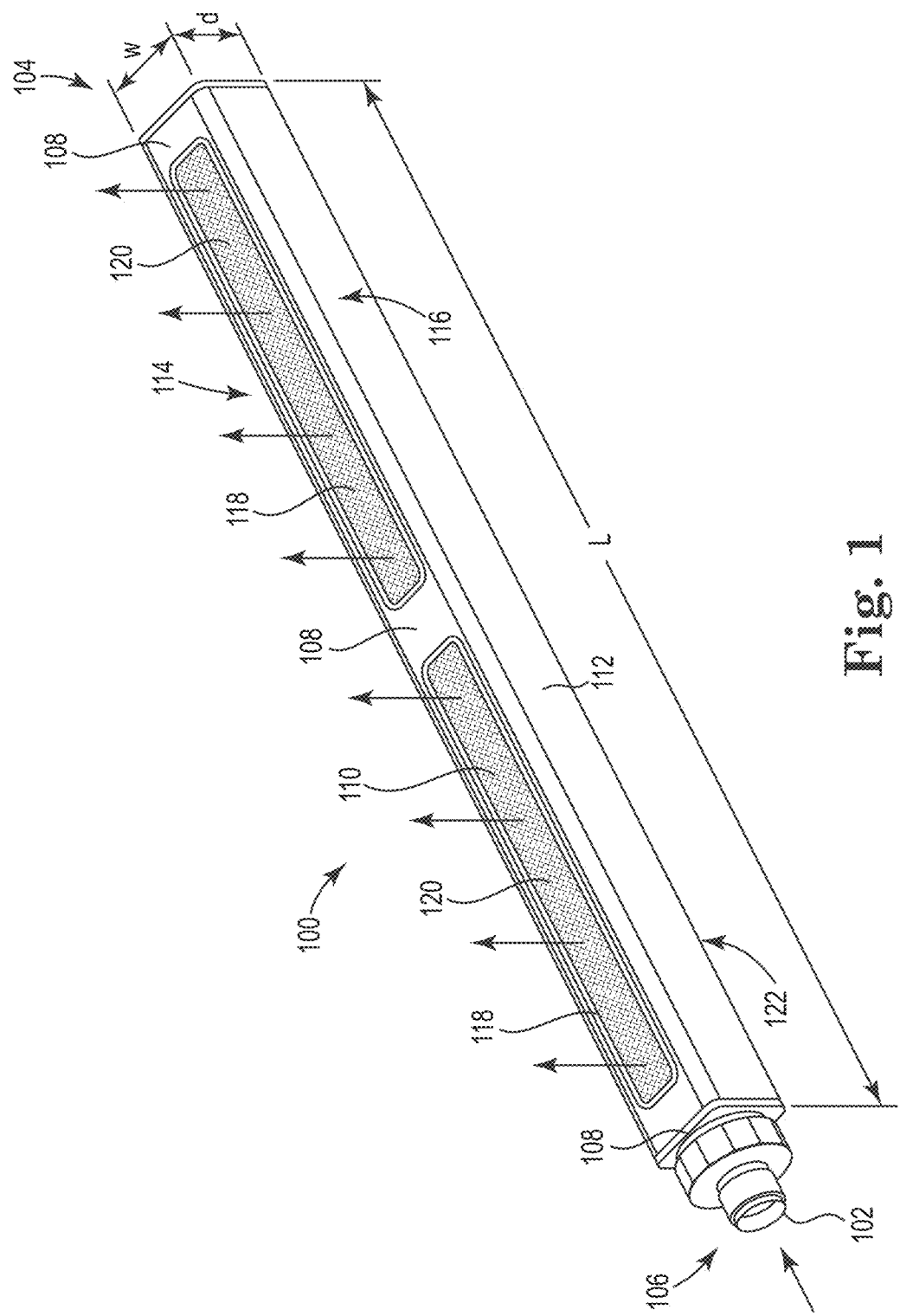
FIG. 1 shows an example of a diffuser housing and diffuser assembly as described.

All figures are schematic and not necessarily to scale.

DETAILED DESCRIPTION

The disclosure relates to diffuser housings (or, simply "housings") for a directional gas diffuser, that are useful to dispense a gaseous raw material (e.g., a "reagent gas") into an enclosed interior of a semiconductor processing chamber, or of other type of vacuum chamber, reaction chamber, etc. The disclosure also relates to: diffuser assemblies that include the housing and other components of a diffuser such as a diffuser membrane, to methods of making the housing and diffuser assemblies, to processing systems that include the diffuser assembly, and to various methods of using the housing and diffuser assemblies.

A diffuser assembly as described is of a type sometimes referred to as a "directional diffuser," which is different from other general types of diffusers, such as "showerhead" diffusers, "tube" diffusers, "disk" diffusers, and "plate" diffusers. A directional diffuser has a form that includes an elongate diffuser body between two ends of an elongate diffuser housing, with one end being a fluid inlet end and the second end being a closed end. The directional diffuser includes a diffuser opening that extends along the length of the elongate diffuser housing between the inlet end and the closed end on only one side of the diffuser body, with a diffuser membrane that covers the opening. The diffuser membrane is porous and semi-resistant to a flow of a gas, allowing gas under moderate pressure to flow through the membrane as a dispersed or "diffused" stream directed from only one side of the housing. The gas flows into the diffuser housing at the inlet end, flows along the length of the housing, and then exits the housing through the membrane in a lateral direction relative to the flow through the housing, and from only a portion (e.g., from one side) of the housing laterally, e.g., perpendicular to the direction of flow of the gas into and within the housing. On the remaining portions of the housing (the sides that don't include the opening and the diffuser membrane), the housing includes non-porous surfaces that enclose an interior channel that extends from the inlet, along the length of the housing, to the closed end, and that contacts the diffuser membrane.

A gaseous fluid can flow into the inlet and into the inlet end of the interior channel. The fluid then flows along the length of the interior channel, which is also along the length of diffuser membrane held in the length-wise opening on one side of the housing. As the fluid flows along the length of the housing within the interior channel a portion of the fluid also passes laterally (relative to the direction of flow along the channel) through the diffuser membrane over the entire length of the membrane. The diffuser membrane functions as a diffuser outlet that extends along the length of the diffuser and allows gas that flows along the length of the diffuser body, within the interior channel, to flow laterally (perpendicular to the length-wise direction of the interior channel) and exit the housing on one (and only one) side of the diffuser housing, with the flow of the gaseous fluid from the housing being predominantly in a direction that is perpendicular to the flow of fluid through the interior channel of the housing, with the fluid entering the channel at the inlet.

The diffuser is described as "directional" because the lateral flow occurs directionally relative to a circumference of the diffuser. The diffuser has a circumference when viewed in a direction of the length. The lateral flow does not occur in all directions of the circumference (i.e., at all 360 degrees of the circumference). Instead, the opening in the housing through which the gas flows is over a portion of the circumference, sometimes referred to as a "side" of the housing. The portion of the housing through which the lateral flow occurs may be less than half of the entire circumference, e.g., flow may occur over less than 180 degrees of the circumference, e.g., over a range from 10 to 170 degrees, or from 20 to 150 degrees, or from 40 to 120 degrees.

A benefit of directional flow from the diffuser over less than the entire circumference is an ability to control direction and placement of direct gas flow into a chamber. The flow may be directed for a purpose of avoiding a direct flow of gas into an area of a chamber at which particle contamination may exist. Direct flow of gas toward particles that have become settled at areas of a chamber can disrupt and disperse the particles within the chamber, which is preferably avoided. More generally, flow may be directed to provide uniform or thorough contact of the gas with a wafer or workpiece within a chamber.

The directional diffuser has a length dimension between the inlet end and the closed end, a width that is transverse to the length, and a depth that is transverse to the length and width. The directional diffuser is elongate, having a length that is greater than the width and that is greater than the depth. Example directional diffusers may have a length that is at least 2, 4, 5, 10, 12, 15, 20, or 30 time the magnitude of the depth, or the width, or both, measured at exterior surfaces of the housing.

Referring to FIG. 1, example directional diffuser 100 is illustrated. Directional diffuser 100 includes housing 112, which has a length (L), a width (w), and a depth (d). Housing 112 includes inlet 102 at inlet end 106, a second end ("closed end") 104, with the length L extending between inlet end 106 and closed end 104. On front side 108 (the top side, as illustrated) of housing 112, openings 118 extend along length L and width w, between inlet end 106 and closed end 104. As illustrated, two separate lengthwise openings 118 are illustrated, but the two openings 118 could alternately be formed as a single opening that is not interrupted along length L. A porous diffuser membrane 120 is held within each of the two openings 118.

In further detail, inlet 102 leads to an interior channel (not shown) that is defined by porous diffuser membrane 120 on one side, and by three elongate non-porous sidewalls on three other sides, including left and right sidewalls 114 (not visible) and 116, and bottom or back sidewall 122 (not visible). Each sidewall 114, 116, and 122, is non-porous, i.e., not permeable to a flow of gas; each sidewall 114, 116, and 122 includes a non-porous inner surface that defines the interior channel that extends along length L of housing 100.

Generally, when positioned for use inside of an enclosed chamber of a semiconductor handling or processing device ("chamber" or "enclosed chamber"), a directional diffuser extends from a sidewall, top, or bottom of the chamber with the length of the diffuser extending from the sidewall, top, or bottom into the interior space of the chamber. Optionally, the directional diffuser can be mounted within the chamber on a rotating mount that allows the diffuser to be rotated about an axis that extends along the length of the diffuser.

Figure 2A:
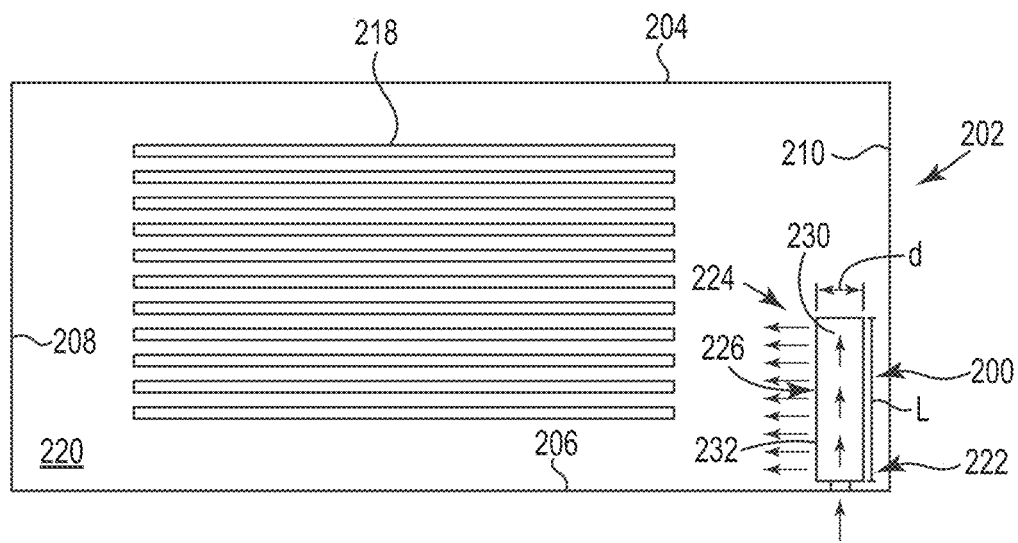
FIGS. 2A and 2B show an example of a chamber and diffuser assembly as described.

Referring to FIG. 2A, illustrated is a side view of a chamber 220 that includes directional diffuser 200 as described herein. Directional diffuser 200 is mounted within an enclosed interior space 220 of chamber 202, and is used to dispense a uniform flow of gas from a gas source (not shown) into interior 220 of chamber 202, which contains wafers 218.

Chamber 202 includes bottom 206, top 204, and (left and right) sidewalls 208 and 210, which define enclosed chamber interior 220. Directional diffuser 200 includes housing 230, inlet end 222, closed end 224, and a length between the two ends. On front side 226 (facing to the left, as illustrated) of housing 230, opening 232 extends along length L and width w between inlet end 222 and closed end 224 and directionally from a portion of a circumference of housing 230 (see FIG. 2B). A porous diffuser membrane (not shown) is held within the opening.

A gaseous fluid enters diffuser 200 at inlet end 222 and flows in a direction of the arrows of FIG. 2A along the length of diffuser 200. As the fluid passes along the length, a portion of the fluid passes laterally (see arrows at FIG. 2A) through the porous diffuser membrane that extends along front face 226. The fluid passes through the porous diffuser membrane and enters interior 220 of enclosed chamber 202.

Figure 2B:
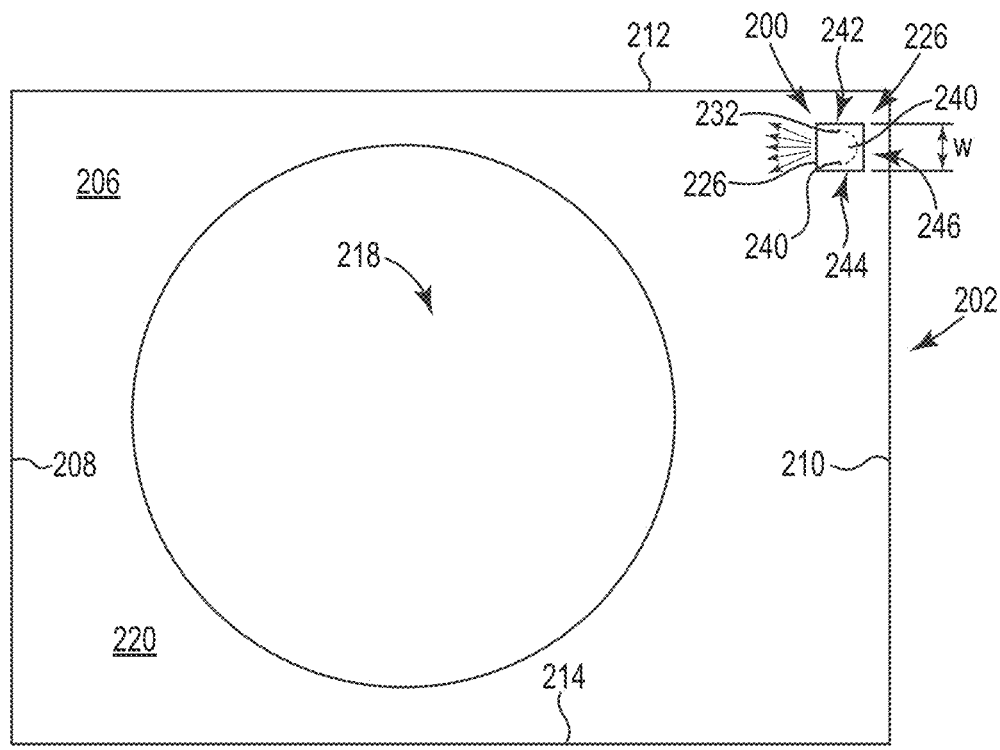

FIG. 2B shows a top, cut-away view of diffuser 200 and chamber 202. Details shown at FIG. 2B include: front and back sidewalls 212 and 214 of chamber 202; sidewalls 242 and 244, and back wall 246, of diffuser housing 230; and interior channel 240 at the interior of diffuser housing 230. Interior channel 240 is defined by a porous diffuser membrane (not shown) that is located at front face 226, and by three elongate non-porous sidewalls on three other sides, including left and right sidewalls 242 and 244, and back sidewall 246. Each sidewall 242, 244, and 246 is non-porous, i.e., not permeable to a flow of gas; each sidewall 242, 244, and 246 includes a non-porous inner surface that defines interior channel 240 that extends along length L of housing 230.

Chamber 202 may be a component of a device or apparatus used in manufacturing, storing, transporting, or handling multiple semiconductor wafers. Example types of devices that contain a chamber 202, e.g., as illustrated at FIGS. 2A and 2B, include devices and apparatuses commonly known as wafer carriers ("FOUPs") and wafer transfer stations. Other examples include deposition chambers (e.g., chemical vapor deposition chambers, atomic layer deposition chambers, etc.), as well as etching chambers, among others. Example gases that may be dispensed for any of these processes include inert gases, reactive or corrosive gases (e.g., halogen or halogen-containing gases such as hydrogen bromide), as well as others.

Referring to FIG. 2A, diffuser 200 may be used to deliver a gas, such as an inert gas, from an external source to interior 220 of chamber 202. According to example diffuser housings and diffuser assemblies, the diffuser housing includes a channel as described, defined within an interior of a housing by non-porous sidewalls (the term "sidewall" referring to sidewalls and backwalls), that is designed with size and shape features that will control a flow of a gaseous fluid through the diffuser membrane to produce useful, desired, or improved flow properties, including with desired uniformity of flow (based on flow pressure, flow rate, or both) through the diffuser membrane, along the diffuser length.

A purpose of a directional diffuser is to dispense a gaseous fluid into a chamber as a uniform flow of the gas. Toward that end, a diffuser assembly as described can be designed to include an interior channel that includes a shape or dimensions that vary along the length of the channel in a manner that provides for added control of the flow of the gas through the diffuser, for example by improving uniformity of flow through the diffuser membrane, at different locations along the length of the diffuser membrane. See e.g., FIG. 5A.

As one mode of providing desired control of flow through a diffuser to achieve improved uniformity of flow along a length of the diffuser, an interior channel may exhibit a varied cross-sectional size (area, having a width component and a depth component, both transverse to a length of a diffuser housing, as shown at FIG. 1) or dimension (e.g., depth or width) along the length. During use, as a gaseous fluid is caused under pressure to enter the interior channel and flow from the inlet end to the closed end of the diffuser assembly, the pressure of the fluid will vary along the length of the diffuser. The pressure of the gas within the channel will normally decrease at locations of the channel that are farther from the source of pressurization of the gas, i.e., farther from the inlet end and closer to the closed end.

To adjust for (e.g., reduce or prevent) a reduction in gas pressure along the length of the interior channel, as gas flows from the inlet end to the closed end of the channel, the channel can be adjusted in size, i.e., in cross-sectional area, in depth, in width, or a combination of these, along the length. To improve uniformity of a flow of gas through the diffuser membrane, meaning to provide more uniform flow of gas (based on flow rate or gas pressure) through the diffuser membrane measured at different locations along the length of the diffuser membrane, the interior channel can have a cross-sectional area, a depth, or both, that decrease along the length of the channel, with the channel having greater cross-sectional area, depth, or both, at locations nearer to the inlet end and reduced cross-sectional area, depth, or both, at locations nearer to the closed end.

Figure 3A:
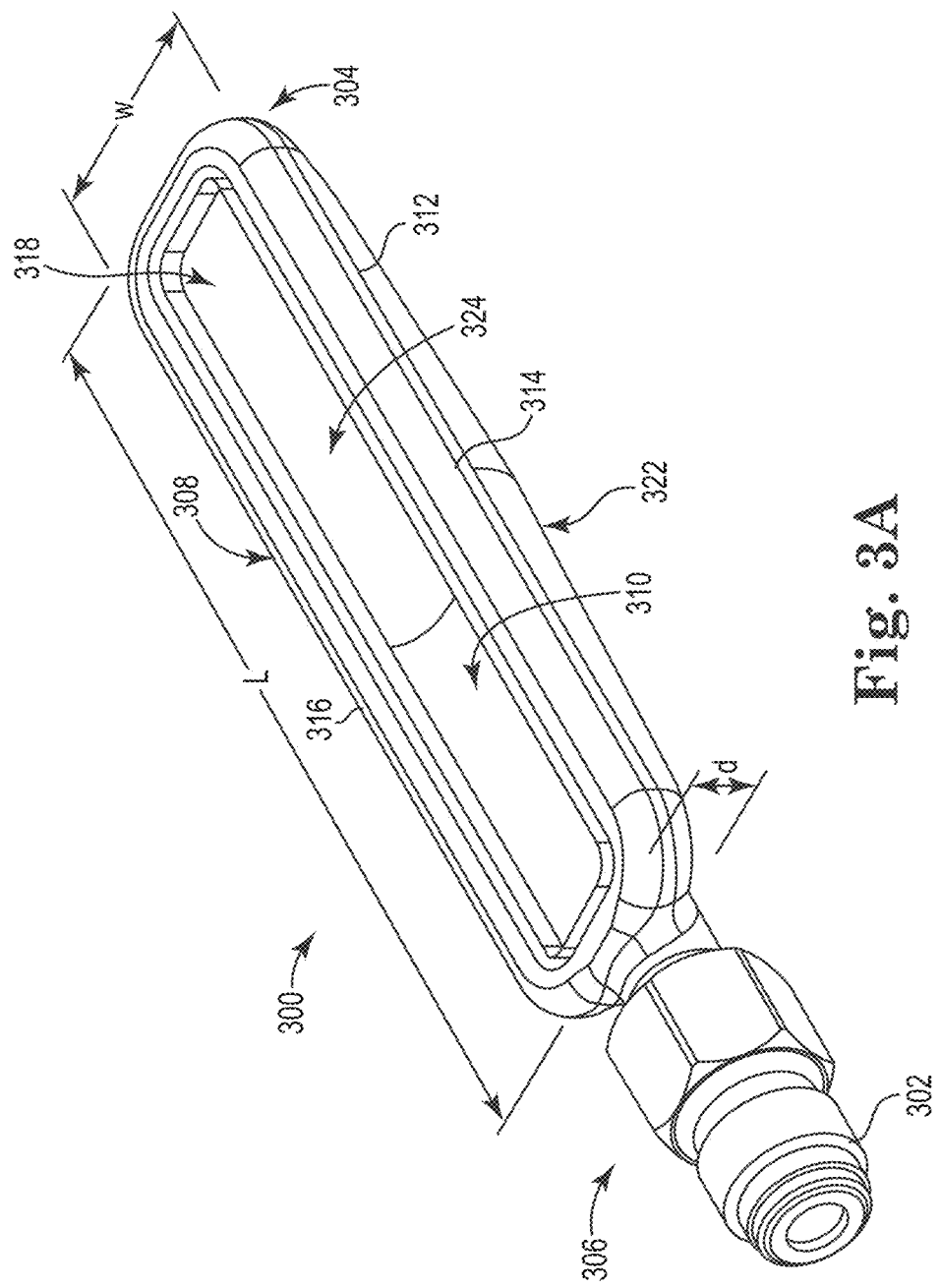
FIG. 3A (side-perspective view), 3B (top view), and 3C (side cut-away view) show an example of a diffuser housing as described.
Figure 3B:
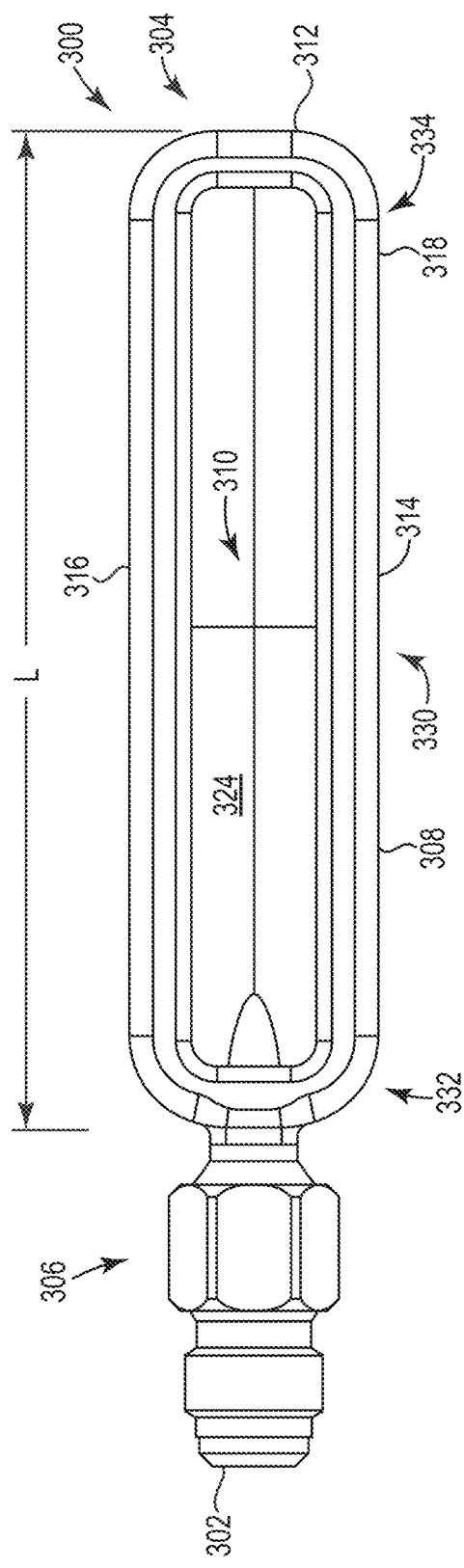
Figure 3C:
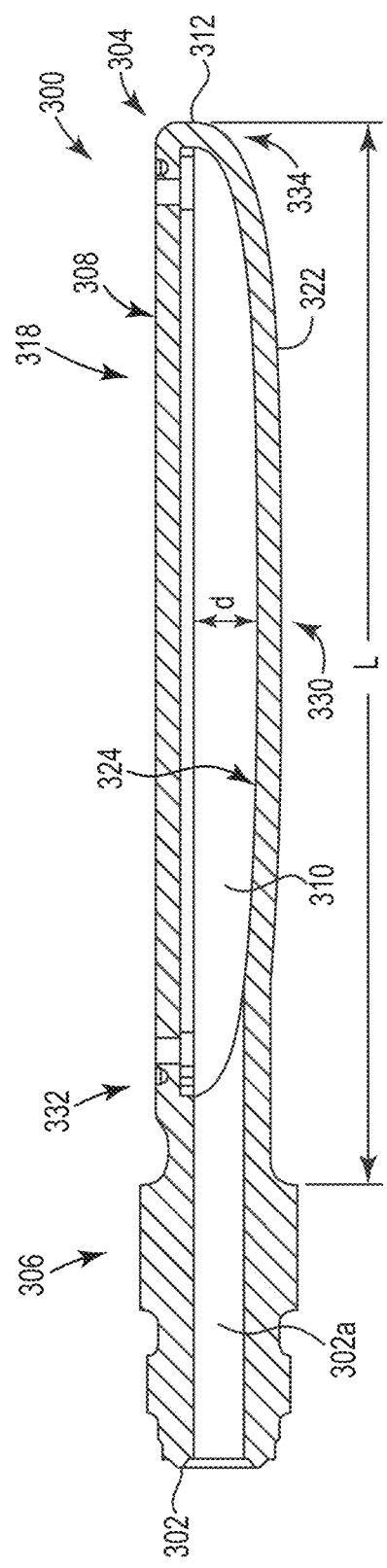

An example of a diffuser (300) that includes an interior channel that has a depth and cross-sectional area that vary along the length of the interior channel is shown at FIGS. 3A, 3B, and 3C. FIG. 3A shows a side-perspective view, FIG. 3B is a top view, and FIG. 3C is a side cut-away view of directional diffuser 300. Referring to FIG. 3A, example directional diffuser 300 is illustrated. Directional diffuser 300 includes housing 312, which has a length (L), a width (w), and a depth (d). Housing 312 includes inlet 302 at inlet end 306, a second end ("closed end") 304, with the length L extending between inlet end 306 and closed end 304. On front side 308 of housing 312, opening 318 extends along length L and width w, between inlet end 306 and closed end 304. A porous diffuser membrane (not shown) may be held within opening 318 as part of a diffuser assembly.

Inlet 302 leads to interior channel 310, defined by opening 318 on one side, and by three elongate (in the length direction) non-porous sidewalls on three other sides, including left and right sidewalls 314 and 316, and bottom or back sidewall 322. The sidewalls are not discrete, but blend together as a single curved surface. Each of sidewalls 314, 316, and 322, is non-porous, i.e., not permeable to a flow of gas; each sidewall 314, 316, and 322 includes a non-porous inner surface 324 that defines the interior channel that extends along length L of housing 300.

As best illustrated by FIG. 3C, interior channel 314 has a cross-sectional area, and a depth (d), that vary along the length (L) of channel 310. In specific with regard to the depth, near inlet end 306, a non-porous lower or back surface 324, which defines a portion of interior channel 310, meets channel 302a of inlet 302. Surface 324 defines a depth (d) of channel 310 between opening 318 and surface 324 of sidewalls 314, 316, and 322. The depth (d) is greatest at the approximate midpoint 330 of channel 324, between distal end 334 of channel 310 and proximal end 332 of channel 310.

Figure 4:
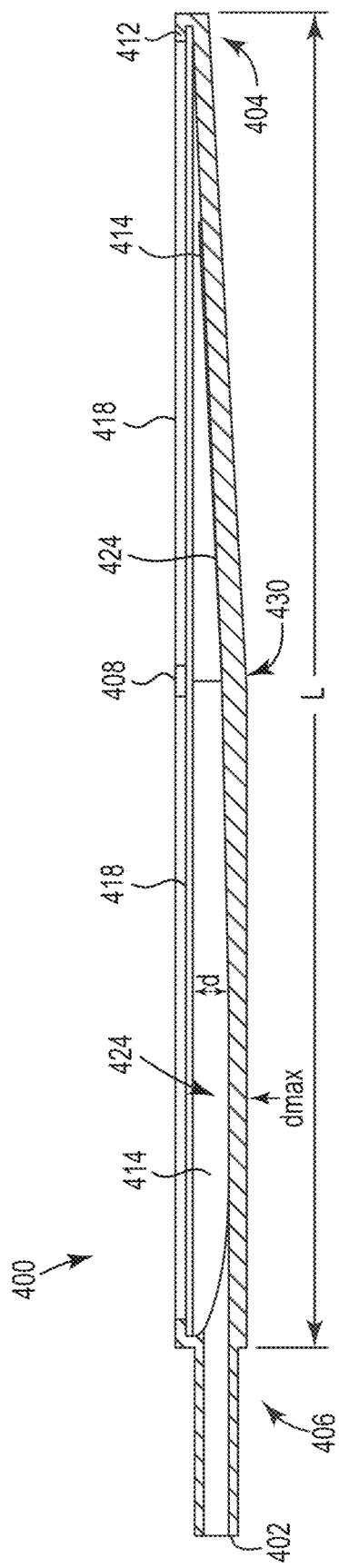
FIG. 4 is a side cut-away view of a diffuser housing as described.

Another example of a diffuser (400) that includes an interior channel that has a cross-sectional area and a depth that each vary along the length of the interior channel is shown at FIG. 4. FIG. 4 shows a side cut-away view of directional diffuser 400, which includes diffuser housing 412, which has a length (L), a width (w), and a depth (d). Housing 412 includes inlet 402 at inlet end 406, a second end ("closed end") 404, with the length L extending between inlet end 406 and closed end 404. On front side 408 of housing 412, openings 418 extend along length L and width w between inlet end 406 and closed end 404. A porous diffuser membrane (not shown) may be held within each elongate opening 418 as part of a diffuser assembly.

Inlet 402 leads to interior channel 414, defined by openings 418 on one side, and by elongate (in the length direction) non-porous sidewalls on the remaining sides. As shown, interior channel 414 has a depth (d) that varies along the length (L) of channel 414, between inlet end 406 and closed end 404; the steady and gradual reduction in depth of interior channel 414 at the distal portion of housing 412 may be referred to as a "tapered" depth or a "tapered" or "gradual" reduction in depth. In specific, near inlet end 406, surface 324 defines a depth (d) of channel 414, between opening 418 and back surface 424. The depth (d) is greatest at d-max, and becomes gradually reduced along length L in the direction toward closed end 404.

According to specific example diffusers of the present description, a diffuser can be designed to have an interior channel that controls a flow of fluid through the length of the diffuser housing and through the diffuser membrane at different locations along the length of the housing, to produce an improved evenness or uniformity of flow through the membrane at locations along the length of the diffuser. Typically, in a directional diffuser that includes an interior channel that is uniform in cross section and dimensions along a length of the diffuser, the flow of gas through the diffuser membrane (at locations along the length of the diffuser) is un-even by having greater flow (or pressure) of fluid at the inlet end and lower flow (or pressure) at the outlet end.

FIGS. 5A and 5B graphically illustrate gas flow rate (velocity) of flow of gaseous fluid through a membranes 510 and 610 of diffusers 500 and 600 as described. Referring to FIG. 5A, diffuser 500, which includes membrane 510, has an internal channel (not shown) that is uniform in cross-sectional area and dimensions along the length of diffuser 500, from inlet end 512 to closed end 514. Gaseous fluid flows into inlet end 512 and passes along the length of diffuser 500 toward closed end 514. Along this path, pressure of the fluid within the interior channel gradually decreases, causing gradually reduced levels of flowthrough membrane 510.

FIGS. 5A and 5B depict higher and lower rates of flow of fluid through diffuser membrane 510 and membrane 610 as a range of shades of grey. Different relative rates of flow are shown in grey-scale. Flows of FIGS. 5A and 5B are lowest at the outer perimeter edges (518, 618) of diffuser membrane 510. A slightly higher relative rate of flow occurs at locations 524 and 624, and areas of the same grey shade. A still slightly higher relative rate of flow occurs at locations 522 and 622 and areas of the same grey shade. The highest relative rate of flow are the darkest areas, locations 520 and 620 and areas of the same dark grey shade.

FIG. 5A shows that a flow of fluid through diffuser membrane 510 is greatest at region 502 near inlet end 512, is gradually reduced along the length of diffuser 500 toward closed end 514, and has a lowest rate of flow near closed end 514. The lack of uniformity of the rate of flow through membrane 510 may not precisely correlate to distance from the inlet, but in a general sense the fluid pressure within the internal channel and the rate of flow of fluid through membrane 510 are greatest near inlet end 512 and lowest near closed end 514 of diffuser 500.

In contrast, FIG. 5B shows a reduction in the variability of flow rate of fluid through a diffuser membrane of a diffuser as described, along the length of the diffuser. Referring to FIG. 5B, diffuser 600, which includes membrane 610, has an internal channel (not shown) that exhibits a gradually reduced depth and cross-sectional area along a length of the diffuser, with a greater depth and cross-sectional area being near inlet end 610, and a lower (e.g., minimum) depth and cross-sectional area being near closed end 614. Gaseous fluid flows into inlet end 612 and passes along the length of diffuser 600 toward closed end 614. Along this path, the cross-sectional area and depth of the internal channel of diffuser 600 are gradually reduced.

FIG. 5B shows a flow of fluid through diffuser membrane 610 that is more uniform along the length of diffuser 600 in comparison to flow of fluid through diffuser membrane 510 of diffuser 500, which does not have a variable depth or cross-sectional area along the length of diffuser 500. The improved uniformity of the rate of flow through membrane 610 can be observed as the relatively even rate of flow of fluid through membrane 610 at region 602 near inlet end 612, compared to the rate of flow of fluid through membrane 610 at region 604 near closed end 614. The rate of flow of gas through membrane 610 may not precisely correlate to a distance from inlet end 612, but in a general sense the rate of flow of gaseous fluid through membrane 610 is not significantly different at region 602, compared to the rate of flow of fluid through membrane 610 at region 604. Some amount of variability in flow rate of gaseous fluid still remains along the length of diffuser 600 and membrane 610, but the variability is reduced relative to the diffuser of FIG. 5A and does not include a significant or distinct maximum flow near inlet end 612 or a significant or distinct minimum level of pressure or flow near closed end 614.

A diffuser assembly includes a diffuser housing as described, and can include one or more diffuser membranes attached to and contained within an opening or openings that extend along the length of the housing on one side of the housing. In use, for a gas to pass from the interior channel to an exterior of the directional diffuser, the gas must pass through the diffuser membrane. The diffuser membrane is located with one surface facing the interior channel of the housing, and a second surface facing a space that is external to the housing, which in use is an enclosed interior space of a chamber.

Various different types of diffuser membranes are known, including various porous or apertured sheet-like structures ("membranes") that allow for a flow of a gaseous fluid through the structure. The membrane diffuser is effective to dispense an even flow of reagent gas from a gas source, that passes through the interior channel of the housing, through the diffuser membrane, and into an interior space of a chamber, with the diffuser assembly extending into an interior space of the chamber. The diffuser membrane is designed to cause the reagent gas to flow evenly into the reaction chamber to distribute the gas uniformly within the chamber in a diffused form, to prevent the flow from disrupting and moving any particulate contaminants that may be present in the interior space.

Examples of diffuser membranes formed from sintered porous bodies are described in United States Patent Publication Number 2013/0305673, the entirety of which is incorporated herein by reference.

Figure 6:
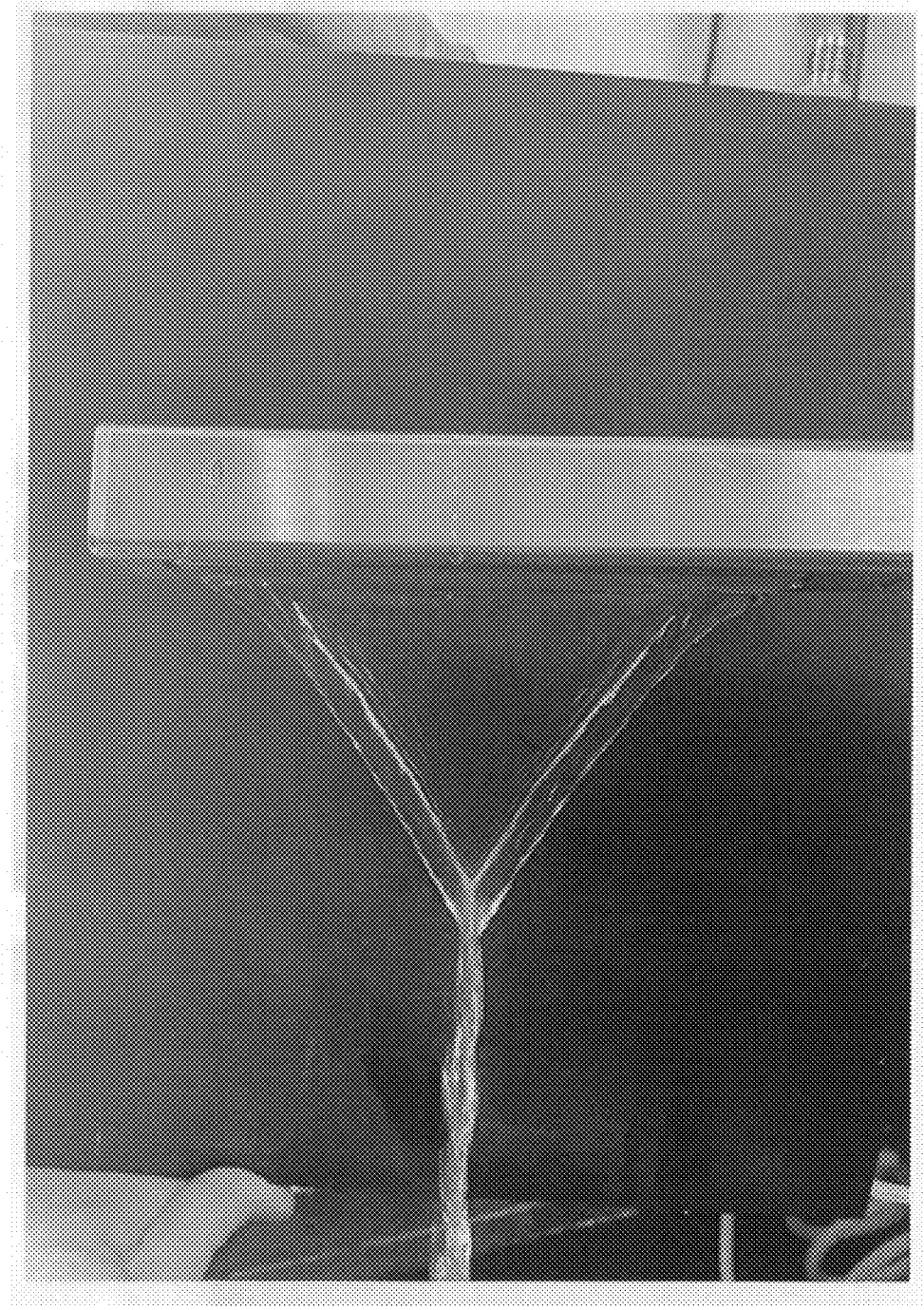
FIG. 6 is a photograph that shows laminar flow of water through a diffuser as described.

According to preferred examples of diffuser assemblies, a directional diffuser as described comprises a flat or slightly curved sheet-type diffuser membrane that is capable of producing a flow of water through the diffuser assembly that exits the diffuser membrane in the form of substantially laminar flow that is relatively even along the length of the diffuser membrane, and that falls from the diffuser membrane as a film or curtain. FIG. 6 is a photograph of an example of a directional diffuser that exhibits this preferred type of laminar flow of water through the diffuser at test conditions.

A diffuser assembly of the present description can be tested for this type of desired laminar flow property, using water, by allowing water (e.g., de-ionized water) to flow through the diffuser assembly by passing into the inlet, flowing through the interior channel, and then flowing through the diffuser membrane located at one surface of the assembly. With the diffuser assembly oriented horizontally, with the length and the width being in a common horizontal plane, and with the diffuser membrane facing down and the depth oriented vertically, water at low to moderate pressure is caused to flow into the inlet and is allowed to pass through the diffuser membrane. Desirably, when tested at ambient pressure and temperature, the water will flow relatively evenly through the diffuser membrane, preferably in the form of a thin film or "curtain" that forms from the flowing water along a length of the diffuser membrane. The water flowing from the membrane preferably retains the form of the film or curtain for as long as the flow is maintained. See FIG. 6.

The diffuser housings described herein, having the described elongate form, input end, closed end, and internal channel, are not limited in terms of any particular method used for preparing a housing. A housing as described may be prepared by any current or future manufacturing method that will is effective to form a diffuser housing as described.

Certain particular methods may be useful to form different examples of the described diffuser housings. For example, diffuser housings that include an interior channel that has a variable cross-sectional area or depth, or both, along the length of the channel, may be difficult to form on a commercial scale, in a cost effective manner, by using only machining, molding, or CNC (computer numerical control) equipment and techniques.

According to example methods and to example diffuser housings, techniques that have been found to be effective for preparing a diffuser housing or a component of a diffuser housing include additive manufacturing techniques, including methods that are commonly referred to as "3-D printing" techniques.

Many different versions of additive manufacturing techniques are known. Additive manufacturing methods generally involve a series of individual layer-forming steps that sequentially form layer-upon-layer of solidified feedstock composition derived from a feedstock composition. Some specific examples of general types of additive manufacturing techniques include those commonly referred to as "powder-bed" additive manufacturing methods, which include various "binder jet printing" techniques. Other examples include stereolithography techniques (SLS) and "feedstock dispensing methods" (FDMs). Still others, referred to as "laser metal deposition," or "direct metal deposition," or "direct energy deposition," involve the use of a laser and feedstock composition (as powder or wire) to continuously form a "weld pool" on surface, which continuously solidifies, to continuously form multiple layers of a multi-layer body.

Diffuser bodies as described may be prepared by any of these additive manufacturing methods, as well as others, any of which may be currently known or developed in the future.

Using a series of additive manufacturing steps, each step forming a single layer of a structure, multiple layers of solidified feedstock are sequentially formed into a structure that is referred to herein as a multi-layer composite (or "composite"). As used herein, the term "composite" (or "multi-layer composite") refers to a structure formed by additive manufacturing by sequentially forming a series of multiple individual and individually-formed layers of solidified feedstock. The composite takes the form of a diffuser housing, or a component of a diffuser housing of the present description, which includes: an inlet end that comprises an inlet; a closed end; a length between the inlet end and the closed end; an opening on a front side; and an interior channel extending between the inlet and the closed end, with the channel defined along the length by the opening on the front side, an elongate, non-porous back surface, and elongate non-porous side surfaces. The housing has dimensions referred to as a length, a width, and a depth, as described herein. In certain embodiments, the cross-sectional area, the depth, or both, of the channel, varies along the length of the channel.

According to example diffuser bodies, prepared by an additive manufacturing technique, the entire housing, between the two ends and from the front face to a back side, can be formed and held together exclusively as a structure of multiple layers formed by multiple layer-forming steps of an additive manufacturing method, and without using a bonding step such as a vacuum brazing step, to bond together two separately-produced pieces. A diffuser housing that is formed as a multi-layer composite by an additive manufacturing method, without bonding (by vacuum brazing, or the like), may be referred to herein as a "continuous" diffuser housing.

The term "continuous" in this context means that a complete housing is formed as a single-piece composite structure from multiple sequentially-formed layers. The term "continuous" does not refer to a structure that is prepared by separately forming two individual pieces and then bonding the two separately-formed pieces together, for example by a vacuum brazing technique or by a different type of bonding technique. A continuous diffuser housing will not include a seam or a boundary that results from a bonding step, especially a seam or boundary that is made of a bonding or filler material that has a composition that is different from the materials of the diffuser housing.

One specific example of an additive manufacturing technique is the technique commonly referred to as "selective laser melting." Selective laser melting (SLM), also known as direct metal laser melting (DMLM) or laser powder bed fusion (LPBF), is a three-dimensional printing method that uses a high power-density laser to melt solid particles of a feedstock material, which allows the melted (liquid) material of the particles to flow to form a layer of the melted material, and then allows the layer to cool and solidify to form solidified feedstock. According to certain particular example methods, the particles of the feedstock can be fully melted to form a liquid (i.e., liquefied), and the liquid material is allowed to flow to form a substantially continuous, substantially non-porous (e.g., less than 80, 85, 90, or 95 percent porosity) film that then cools and hardens as a solidified feedstock layer of a multi-layer composite.

Additive manufacturing techniques may be useful for forming diffuser housings made from a broad range of materials, including metal materials (including alloys), metal matrix composite materials, ceramic materials, polymers, and combinations of these.

With additive manufacturing techniques, including selective laser melting techniques, the range of possible metals, alloys, and metal matrix composites that can be used to form a diffuser housing can advantageously include materials that are not easily formed into a useful diffuser housing by previous techniques such as machining techniques. The range of materials available with additive manufacturing techniques includes metals and metal alloys that can be melted by laser energy, such as aluminum alloys, iron-based alloys (stainless steel alloys) titanium alloys, nickel and nickel-based alloys, and various metal matrix composite materials, some of which are not easily processed by machining. Example materials may exhibit such high hardness that the materials can be difficult to process by machining techniques to form precise structures of a diffuser housing, including precise dimensions and varied dimensions (e.g., a varied depth). Using additive manufacturing techniques, these materials can be processed to form a diffuser housing that includes an interior channel that has variable dimensions, e.g., variable cross-sectional area, variable depth, or both, along the length of the channel, even from materials that would be difficult to similarly form by using standard machining techniques.

The material that is used to prepare the diffuser housing may be any material that is useful for preparing a diffuser housing, for example inorganic materials that include various metals (including alloys), metal matrix composites, ceramic materials, and polymers.

Examples of useful polymers may include polyethylene, polystyrene, and fluoropolymers, which includes hydrofluoropolymers and perfluoropolymers, such as polytetrafluoroethylene (PTFE) and perfluoroalkyl polymers (PFAs).

The term "metal" is used herein in a manner that is consistent with the meaning of the term "metal" within the metal, chemical, and additive manufacturing arts, and refers to any metallic or metalloid chemical element or an alloy of two or more of these elements.

The term "metal matrix composite" ("MMC") refers to a composite material that has been prepared to include at least two constituent parts or two phases, one phase being a metal or metal alloy and another phase that is a different metal or another non-metal material such as a fiber, particle, or whisker, that is dispersed through a metallic matrix. The non-metal material may be carbon-base, inorganic, ceramic, etc. Some example metal matrix composite materials are made of combinations of: an aluminum alloy with alumina particles; an aluminum alloy with carbon; an aluminum alloy with silicon; an aluminum alloy with silicon carbide (SiC); a titanium alloy with $TiB_2$; a titanium alloy with silicon; a titanium alloy with silicon carbide (SiC).

Metal and metal alloys that may be useful according to methods of the present description include metal and metal alloys that have in the past been used for preparing diffuser structures, and, additionally, other materials that have not. Useful or preferred materials include metals such as iron alloys (e.g., stainless steel and other types of steel), titanium and titanium alloys, nickel and nickel alloys (e.g., Hastelloy C22, Hastelloy C276), aluminum and aluminum alloys, molybdenum and molybdenum alloys, and various metal matrix composite materials.

By an additive manufacturing method, a complete (or substantially complete) functional diffuser housing can be prepared using a single manufacturing process (a single additive manufacturing "step"), which offers high manufacturing efficiency in a reduced amount of time per unit (high manufacturing throughput). A diffuser housing that is complete with substantially all required structures (e.g., an inlet end, closed end, front face, sidewalls, and an interior channel) may be prepared by a single series of additive manufacturing steps. For example, what can be referred to as a "one-step" additive manufacturing process to form a diffuser structure can form many, most, or all required structures of the diffuser housing (e.g., an inlet end, closed end, front face, sidewalls, and an interior channel) as a single, multi-layer composite as described. A one-step additive manufacturing process avoids the need to form multiple separate pieces individually by separate steps, followed by a still additional step of bonding the multiple, separately-formed pieces together to form a functional diffuser structure.

Still further, additive manufacturing techniques can be used to form a diffuser housing that has high-precision dimensions, or varied dimensions or shapes, including shapes or varied dimensions that are difficult to form by conventional techniques, including a varied dimension (cross-sectional area, depth, width, or a combination of these) of an interior channel along the length of the interior channel.

Each layer of a composite may be formed as desired, from a desired material, and with a desired thickness, to produce a diffuser housing in the form of a multi-layer composite that has a design as described. By exemplary additive manufacturing methods, each layer is prepared from a collection of particles (referred to as "feedstock") that is generally in the form of a powder. A feedstock contains small particles made of one or a variety of different inorganic materials that can be melted by a high energy laser to liquefy and flow to form a layer of the melted material, then cool to solidify to form a layer of a multi-layer composite.

Particles that are useful according to the present description may be any particles that can be processed to form a useful multi-layer composite as described. Examples of useful particles include inorganic particles that are capable of being completely melted, partially melted (e.g., sintered), or liquefied, by laser energy to form a layer of a diffuser housing as described. Examples of such particles include inorganic particles that are made of metals (including alloys), ceramic, or metal matrix composites. Some useful examples, generally, include metals and metal alloys such as stainless steel, nickel-based alloys, aluminum and aluminum alloys, and titanium and titanium alloys, as well as metal matrix composites.

Useful particles of a feedstock can be of any size (e.g., mean particle size) or size range that is effective, including small or relatively small particles on a scale of microns (e.g., having an average size of less than 500 microns, less than 100 microns, less than 50 microns, 10 microns, or less than 5 microns).

The particles can be selected to achieve effectiveness in processing as described, to be capable of being contained in a feedstock, formed into a feedstock layer, and fully melted or partially melted (e.g., sintered) to form a layer that contains the melted particles, that can cool to form solidified feedstock as a layer of a multi-layer composite. The size, shape, and chemical makeup of the particles can be any that are effective for these purposes.

The particles can be in the form of a feedstock composition that can be used in an additive manufacturing process of the present description. According to examples, feedstock useful in an additive manufacturing process may contain particles that are capable of being heated to be partially melted or fully melted then cooled to form a layer of a multi-layer composite. The feedstock material is not required to contain any other material, but may if desired optionally contain amounts of other materials.

Example feedstock compositions for use in selective laser melting or selective laser sintering techniques may contain at least 80, 90, or 95, 98, or 99 percent inorganic particles by weight, based on total weigh of a feedstock composition. Other ingredients may be present if desired, at low amounts, such as one or more of a flow aid, surfactant, lubricant, leveling agent, or the like.

Each layer of a multi-layer composite may be formed to have any useful thickness. A thickness of a layer of a multi-layer composite is measured of a layer of the composite after the layer has been formed by melting particles of a feedstock layer to form a melted feedstock layer, and then cooled to form a solidified feedstock layer of the composite. Example thicknesses of a solidified layer of a composite may be in a range from 30 microns to 100, 200, or more microns, e.g., from 30 to 50, 60, 70, 80, microns up to 90, 100, 150, 200, 300, 400, or 500 microns. In example composite structures, all layers of the composite may have the same thickness or substantially the same thickness. In other example composite structures, the layers may not all have the same thickness, but different layers of the composite may each have different thicknesses.

A diffuser housing as described can be prepared by additive manufacturing methods that form a dense metal or metal matrix composite multi-layer composite structure, using a series of individual layer-forming steps. As one example, techniques referred to laser additive manufacturing techniques (LAMTs) may be used to form a multi-layer composite in a layer-by-layer, "additive manufacturing" fashion. Laser additive manufacturing techniques use a high-power laser energy to selectively cause metal or metal matrix composite particles of a feedstock layer to be heated, melt (at least partially), flow, and form a substantially solidified feedstock layer. By one specific example, referred to as selective laser melting (SLM), the feedstock layer is melted to form a substantially continuous, non-porous, melted layer, which solidifies as a substantially continuous, non-porous solidified feedstock layer. By a different specific example, referred to as selective laser sintering (SLS), the feedstock layer is sintered (partially melted) to form layer of partially melted feedstock particles, which cools to form a solidified feedstock layer that may contain a certain level of space between the melted particles, as pore space.

More specifically, a multi-layer composite may be built by sequential steps of producing many thin cross sections ("solidified feedstock" of a "layer," herein) of a larger three-dimensional structure (composite). A layer of feedstock is formed, and includes many particles of metal or metal matrix composite. Laser energy is selectively applied to the feedstock layer over a portion of a layer of the feedstock. The portion of a feedstock layer that receives laser energy is a portion that will be formed as the diffuser housing.

The laser energy at least partially melts particles at the portion of the feedstock that are exposed to the laser energy. The melted material of the particles liquefies and flows to contact other melted particles, and the melted particles cool to solidify as a layer of solidified feedstock.

After an initial layer of solidified feedstock is formed, an additional thin layer of the feedstock is deposited over the top surface of the completed layer that contains the solidified feedstock. The process is repeated to form multiple layers of the solidified feedstock, each layer being formed on top of and adhering to a top surface of a previous layer. Multiple layers are deposited, successively, one over each completed layer, to form a multi-layer composite that is a composite of multiple layers of successively-formed solidified feedstock. The multiple layers may be of the same composition and thickness, or may be of different compositions and different layer thicknesses.

Binder jet additive manufacturing methods involve a polymer for forming a solidified feedstock layer, the formation of a "green body" that contains the polymer, and post-processing steps such as debinding to remove the polymer and heat treatment (e.g., sintering). Many laser-based additive manufacturing methods such as those described generally and specifically herein avoid the need for a polymer during formation of solidified feedstock layers. These laser-based methods also do not require a debinding step or a sintering step to form a final multi-layer composite.

A first aspect is directed to a directional gas diffuser comprising: an elongate housing, the housing comprising: an inlet end, a closed end, a length between the inlet end and the closed end, an opening extending along the length on a front side of the housing, and a channel extending between the inlet end and the closed end, the channel defined along the length by: the opening extending along the front side, an elongate back surface, and elongate side surfaces, wherein the channel has a length, a width, a depth, and a varied cross-sectional area along the channel length.

In a second aspect according the first aspect, the length is greater than the width, and the width is greater than a maximum depth of the channel.

In a third aspect according to any preceding aspect, the depth decreases along a portion of the length as the channel extends toward the closed end.

In a fourth aspect according to any preceding aspect, the elongate back surface is non-porous and the two elongate side surfaces are non-porous.

In a fifth aspect according to any preceding aspect, the housing further comprising a multi-layer composite that extends from the elongate back surface to the front side.

In a sixth aspect according to any preceding aspect, the multi-layer composite comprises: a metal or metal alloy, a metal composite matrix, a ceramic, or a polymer.

In a seventh aspect according to any preceding aspect, the multi-layer composite does not contain a seam.

In an eighth aspect according to any preceding aspect, the diffuser further comprising a diffuser membrane secured to the opening.

In a ninth aspect according to the eighth aspect, relative to an otherwise comparable diffuser having a channel with a uniform cross-sectional area, the varied cross-sectional area along the length produces a more uniform rate of flow of fluid through the diffuser membrane along the length of the diffuser membrane.

In a tenth aspect according to the eighth or ninth aspect, the diffuser is capable of producing a laminar flow of water through the diffuser membrane, whereby with the diffuser situated horizontally with the diffuser membrane facing down, water passing through the diffuser is capable of producing a continuous thin water film that forms from the flowing water along a length of the diffuser membrane.

An eleventh aspect is directed to a directional gas diffuser comprising: an elongate housing, the housing comprising: an inlet end that comprises an inlet, a closed end, a length between the inlet end and the closed end, an opening extending along the length on a front face of the housing, and an interior channel extending between the inlet and the closed end, the channel defined along the length by: the opening on the front side, an elongate, non-porous back surface, and elongate non-porous side surfaces.

In a twelfth aspect according to the eleventh aspect, the length is greater than the width, and the width is greater than a maximum depth of the channel.

In a thirteenth aspect according to the eleventh or twelfth aspect, the depth decreases along a portion of the length as the channel extends toward the closed end.

In a fourteenth aspect according to any of the eleventh through thirteenth aspects, the elongate back surface is non-porous and the two elongate side surfaces are non-porous.

In a fifteenth aspect according to any of the eleventh through fourteenth aspects, the housing further comprising a multi-layer composite that extends from the elongate back surface to the front side.

In a sixteenth aspect according to the fifteenth aspect, the multi-layer composite comprises: a metal or metal alloy, a metal composite matrix, a ceramic, or a polymer.

In a seventeenth aspect according to any of the eleventh through sixteenth aspects, the multi-layer composite does not contain a seam.

An eighteenth aspect is direct to an apparatus comprising a chamber that includes an interior adapted to contain one or more semiconductor wafers, the chamber comprising the directional gas diffuser of any the preceding aspects at the interior, connected to a source of inert gas.

A nineteenth aspect according to the eighteenth aspect selected from a wafer carrier and a wafer transfer station.

A twentieth aspect directed to a method of equalizing pressure in a chamber of the wafer transfer station of the nineteenth aspect, the method comprising: with the chamber containing multiple semiconductor wafers, with the chamber closed and containing an interior at below atmosphere pressure, dispensing inert gas through the diffuser to increase the pressure within the interior.

A twenty-first aspect directed to a method of displacing a gaseous atmosphere in a chamber of the wafer carrier of the nineteenth aspect, the method comprising: with the chamber containing multiple semiconductor wafers in the gaseous atmosphere, dispensing inert gas through the diffuser to add the inert gas to the interior.

In a twenty-second aspect according to the twenty-first aspect, the gaseous atmosphere in the chamber is air, and the inert gas displaces the air.

A twenty-third aspect is directed to a method of making housing of a directional gas diffuser of any of the first through seventeenth aspects, by additive manufacturing, the method comprising: forming a first layer of solidified feedstock, forming a second layer of solidified feedstock on a surface of the first layer of solidified feedstock, wherein the layers of solidified feedstock are part of the housing.

A twenty-fourth aspect according to the twenty-third aspect further comprising: forming a first feedstock layer on a surface, the feedstock layer comprising inorganic particles; forming solidified feedstock from the first feedstock layer; forming a second feedstock layer over the first feedstock layer, the second feedstock layer comprising inorganic particles; and forming second solidified feedstock from second feedstock layer, wherein the solidified feedstock layers are part of a housing of a directional gas diffuser.

A twenty-fifth aspect according to the twenty-third aspect further comprising forming solidified feedstock by melting inorganic particles using a laser.

In a twenty-sixth aspect according to any of the twenty-third through twenty-fifth aspects, the solidified feedstock layers comprise particles selected from: metal or metal alloy particles, metal composite matrix particles, ceramic particles, and polymer particles.

The invention claimed is:

1. A directional gas diffuser comprising:
    an elongate housing, the housing comprising:
        an inlet end,
        a closed end,
        a length between the inlet end and the closed end,
        an opening extending along the length on a front side of the housing, and
        a channel extending between the inlet end and the closed end, the channel defined along the length by:
            the opening extending along the front side,
            an elongate back surface, and
            elongate side surfaces, wherein
    the channel has a length, a width, a depth, and a varied cross-sectional area along the channel length.

2. The diffuser of claim 1, wherein the length is greater than the width, and the width is greater than a maximum depth of the channel.

3. The diffuser of claim 1, wherein the depth decreases along a portion of the length as the channel extends toward the closed end.

4. The diffuser of claim 1, wherein the elongate back surface is non-porous and the two elongate side surfaces are non-porous.

5. The diffuser of claim 1, the housing further comprising a multi-layer composite that extends from the elongate back surface to the front side.

6. The diffuser of claim 5, wherein the multi-layer composite comprises: a metal or metal alloy, a metal composite matrix, a ceramic, or a polymer.

7. The diffuser of claim 1, wherein the multi-layer composite does not contain a seam.

8. The diffuser of claim 1, further comprising a diffuser membrane secured to the opening.

9. The diffuser of claim 8, wherein relative to an otherwise comparable diffuser having a channel with a uniform cross-sectional area, the varied cross-sectional area along the length produces a more uniform rate of flow of fluid through the diffuser membrane along the length of the diffuser membrane.

10. The diffuser of claim 8 capable of producing a laminar flow of water through the diffuser membrane, whereby with the diffuser situated horizontally with the diffuser membrane facing down, water passing through the diffuser is capable of producing a continuous thin water film that forms from the flowing water along a length of the diffuser membrane.

11. A directional gas diffuser comprising:
an elongate housing, the housing comprising:
an inlet end that comprises an inlet,
a closed end,
a length between the inlet end and the closed end,
an opening extending along the length on a front face of the housing, and
an interior channel extending between the inlet and the closed end, the channel defined along the length by:
the opening on the front side,
an elongate, non-porous back surface, and
elongate non-porous side surfaces.

12. The diffuser of claim 11, wherein the length is greater than the width, and the width is greater than a maximum depth of the channel.

13. The diffuser of claim 11, wherein a depth of the channel decreases along a portion of the length as the channel extends toward the closed end.

14. The diffuser of claim 11, the housing further comprising a multi-layer composite that extends from the elongate back surface to the front side.

15. The diffuser of claim 14, wherein the multi-layer composite comprises: a metal or metal alloy, a metal composite matrix, a ceramic, or a polymer.

16. The diffuser of claim 14, wherein the multi-layer composite does not contain a seam.

17. An apparatus comprising a chamber that includes an interior adapted to contain one or more semiconductor wafers, the chamber comprising the directional gas diffuser of claim 1 at the interior, connected to a source of inert gas.

18. The apparatus of claim 17, selected from a wafer carrier and a wafer transfer station.

19. A method of equalizing pressure in a chamber of the wafer transfer station of claim 18, the method comprising: with the chamber containing multiple semiconductor wafers, with the chamber closed and containing an interior at below atmosphere pressure, dispensing inert gas through the diffuser to increase the pressure within the interior.

20. A method of displacing a gaseous atmosphere in a chamber of the wafer carrier of claim 18, the method comprising: with the chamber containing multiple semiconductor wafers in the gaseous atmosphere, dispensing inert gas through the diffuser to add the inert gas to the interior.

21. The method of claim 20, wherein the gaseous atmosphere in the chamber is air, and the inert gas displaces the air.

22. A method of making housing of a directional gas diffuser of claim 1, by additive manufacturing, the method comprising:
forming a first layer of solidified feedstock,
forming a second layer of solidified feedstock on a surface of the first layer of solidified feedstock,
wherein the layers of solidified feedstock are part of the housing.

23. The method of claim 22, further comprising: forming a first feedstock layer on a surface, the feedstock layer comprising inorganic particles;forming a first solidified feedstock from the first feedstock layer;forming a second feedstock layer over the first feedstock layer, the second feedstock layer comprising inorganic particles; and forming a second solidified feedstock from the second feedstock layer, wherein the first and second solidified feedstock layers are part of a housing of a directional gas diffuser.

24. The method of claim 22, further comprising forming solidified feedstock by melting inorganic particles using a laser.

25. The method of claim 22, wherein the solidified feedstock layers comprise particles selected from: metal or metal alloy particles, metal composite matrix particles, ceramic particles, and polymer particles.

* * * * *